(12) United States Patent
Pattekar et al.

(10) Patent No.: US 8,272,392 B2
(45) Date of Patent: Sep. 25, 2012

(54) ELECTROSTATICALLY ADDRESSABLE MICROVALVES

(75) Inventors: Ashish Pattekar, Cupertino, CA (US); Eugene M. Chow, Mountain View, CA (US); Eric Peeters, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 88 days.

(21) Appl. No.: 12/818,788

(22) Filed: Jun. 18, 2010

(65) Prior Publication Data

US 2010/0252117 A1    Oct. 7, 2010

Related U.S. Application Data

(62) Division of application No. 11/959,778, filed on Dec. 19, 2007.

(51) Int. Cl.
*F16K 31/126* (2006.01)
*F16K 7/02* (2006.01)

(52) U.S. Cl. ............... 137/1; 137/597; 251/4; 251/61.1; 251/129.06

(58) Field of Classification Search .............. 137/1, 597; 251/4, 5, 30.01, 30.02, 30.05, 61.1, 129.01, 251/129.06
See application file for complete search history.

(56) References Cited

U.S. PATENT DOCUMENTS

| | | | |
|---|---|---|---|
| 4,687,317 A | 8/1987 | Appel et al. | |
| 4,858,883 A | 8/1989 | Webster | |
| 5,019,837 A | 5/1991 | Schwarz | |
| 5,241,991 A | 9/1993 | Iorio et al. | |
| 5,325,880 A * | 7/1994 | Johnson et al. | 137/1 |
| 5,346,372 A | 9/1994 | Naruse et al. | |
| 5,404,202 A | 4/1995 | Abramsohn | |
| 5,610,795 A | 3/1997 | Snelling | |
| 5,645,888 A | 7/1997 | Titterington et al. | |
| 5,901,939 A * | 5/1999 | Cabuz et al. | 251/129.02 |
| 5,932,799 A * | 8/1999 | Moles | 73/53.01 |

(Continued)

FOREIGN PATENT DOCUMENTS

DE    102005012801 A1    9/2006

(Continued)

OTHER PUBLICATIONS

Kipphan, Helmut "Letterpress Printing", Handbook of Print Media, Spring 2001, pp. 395-400.

(Continued)

*Primary Examiner* — John Rivell
*Assistant Examiner* — Kevin Murphy
(74) *Attorney, Agent, or Firm* — Bever, Hoffman & Harms, LLP; Patrick T. Bever

(57) ABSTRACT

A method of controlling a main fluid in a conduit using a microvalve is described. The microvalve includes a corresponding actuation aperture in an actuation aperture layer. A control fluid flows through the actuation aperture in response to an electric field applied via a charge distribution near an actuation aperture layer. In one embodiment, the electric field may adjust the opening and closing of the actuation aperture thereby controlling the flow of the control fluid. In a second embodiment, the control fluid is an electrorheological fluid where the electric field controls the viscosity of the ER fluid, thereby controlling fluid flow through the actuation aperture. In both embodiments the flow of the control fluid controls stretching of a flexible membrane into and out of the conduit, thereby controlling the flow of the main fluid by opening or closing the conduit.

2 Claims, 10 Drawing Sheets

U.S. PATENT DOCUMENTS

| | | | |
|---|---|---|---|
| 5,971,355 A | 10/1999 | Biegelsen et al. | |
| 5,977,685 A | 11/1999 | Kurita et al. | |
| 5,981,024 A | 11/1999 | Noergaard et al. | |
| 6,123,316 A * | 9/2000 | Biegelsen et al. | 251/129.01 |
| 6,234,079 B1 | 5/2001 | Chertkow | |
| 6,626,416 B2 * | 9/2003 | Sharma et al. | 251/129.06 |
| 6,645,403 B1 | 11/2003 | Park et al. | |
| 6,685,442 B2 | 2/2004 | Chinn et al. | |
| 7,011,288 B1 * | 3/2006 | Slicker et al. | 251/11 |
| 7,040,338 B2 * | 5/2006 | Unger et al. | 137/15.19 |
| 2002/0100888 A1 | 8/2002 | Sharma et al. | |
| 2003/0141473 A1 * | 7/2003 | Pelrine et al. | 251/129.06 |
| 2004/0129158 A1 | 7/2004 | Figov et al. | |
| 2005/0045480 A1 | 3/2005 | Krumme | |
| 2006/0118895 A1 | 6/2006 | Unger | |
| 2006/0141762 A1 | 6/2006 | Khandekar et al. | |
| 2007/0076084 A1 | 4/2007 | Iftime et al. | |

FOREIGN PATENT DOCUMENTS

| | | |
|---|---|---|
| EP | 1798030 A1 | 6/2007 |
| EP | 1935638 A2 | 6/2008 |
| WO | WO02/051639 A2 | 7/2002 |

OTHER PUBLICATIONS

Dow Corning Product Information Sheet, Sylgard 170, 2008, 3 pgs.

* cited by examiner

ELECTROSTATICALLY ADDRESSABLE MICROVALVES

CROSS-REFERENCE TO RELATED APPLICATIONS

This application is a divisional of U.S. patent application Ser. No. 11/959,778, filed Dec. 19, 2007 entitled "Novel Electrostatically Addressable Microvalves" which is related to U.S. patent application Ser. No. 11/644,067, filed Dec. 22, 2006 entitled "An Improved Method Of Forming A Reconfigurable Relief Surface Using Microvalves;" and U.S. patent application Ser. No. 11/644,058, filed Dec. 22, 2006 entitled "An Improved Method Of Forming A Reconfigurable Relief Surface Using An Electrorheological Fluid," and U.S. patent application Ser. No. 11/644,352 entitled "A Novel Microvalve" filed on Dec. 22, 2006. The contents of the related U.S. patent applications are hereby incorporated by reference in their entirety.

BACKGROUND

Microvalves are an integral part of many devices, particularly BioMEMS and "lab-on-a-chip" devices where minute quantities of fluids need to be manipulated. U.S. Patent application 20060118895 entitled "Electrostatic/electrostrictive Actuation of Elastomer Structures Using Compliant Electrodes" by Unger and assigned to Fluidigm Corporation describes implementation of such a microvalve design. In one design, Fluidigm describes a fluid flow through a main conduit. Adjustments of pressure in a control conduit running perpendicular to the main conduit bows an elastic wall separating the two conduits thereby controlling fluid flow through the main conduit without fluid mixing.

One problem with the Fluidigm design is the need for an array of separate external pneumatic actuation/pressure control valves. In order to control each microvalve, each microvalve requires a corresponding external actuation/pressure control valve. Implementing an array of such external actuation/pressure controllers adds significantly to the cost and bulk of the Fluidigm microvalves.

An alternate Fluidigm design, utilizes electrostatic forces to directly move a membrane between two positions and thereby close a microvalve. However, using this design, electrostatic forces are typically only sufficient to switch a microvalve in a low pressure system. At higher pressures, the electrostatic forces are insufficient to directly manipulate higher pressure fluid flow.

Thus a less bulky, more inexpensive microvalve that is capable of controlling higher fluid pressures is needed.

SUMMARY

A novel microvalve is described. The novel microvalve includes an actuation aperture in an actuation aperture layer. A flexible membrane portion of the novel microvalve includes a first side approximately sealing one end of the actuation aperture; a second side of the flexible membrane forms a portion of a conduit to carry a main fluid being controlled. A flow control mechanism controls the flow of a control fluid in the actuation aperture such that the pressure driven flow of the control fluid determines a stretching of the flexible membrane. The stretching of the flexible membrane determines the main fluid flow in the conduit.

DETAILED DESCRIPTION

A novel microvalve structure and method of opening and closing the microvalve is described. As used herein, a "microvalve" is broadly defined as any device for controlling the flow of small quantities of fluid. A "fluid" is broadly defined to include any material in a liquid or gaseous state that flows. The particular microvalve structure described is particularly useful but not limited to manipulating biological samples for lab-on-a-chip and bio-MEMS related application such as drug screening and DNA analysis.

Figure 1:
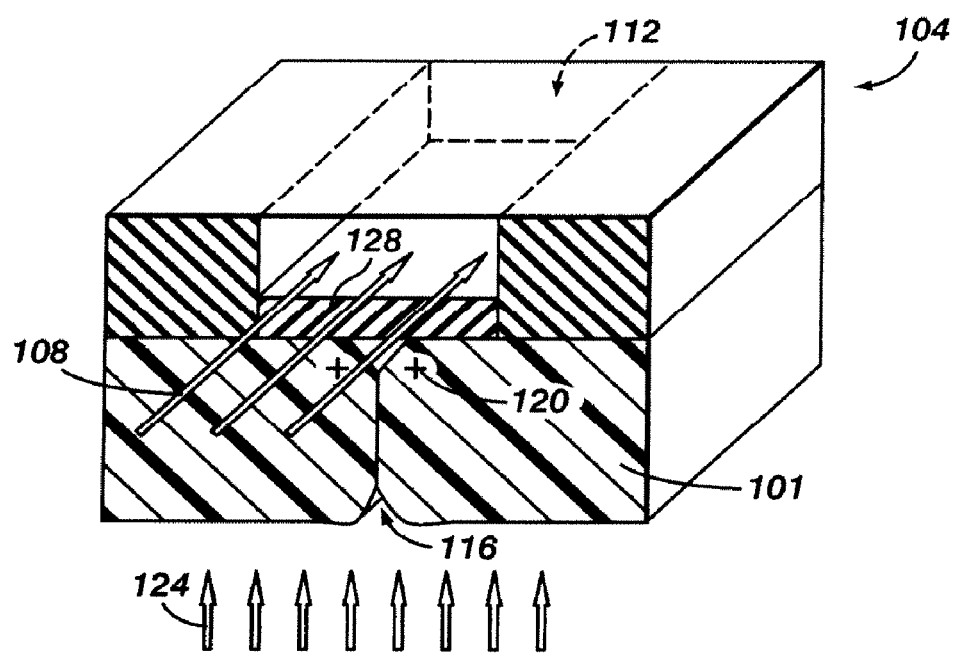
FIG. 1 shows an example closed actuation aperture used to produce an open microvalve state.

FIG. 1 shows an example of a microvalve 104 used to control a fluid 108 flowing through a primary or main fluid conduit 112. As used herein, "main fluid" is a generic term for any fluid, the flow of which is being controlled by the microvalve. Microvalve 104 includes an actuation aperture 116 with a "flow control mechanism". As used herein, "flow control mechanism" is broadly defined to be any technique or system that controls or adjusts the flow or quantity of control fluid in the actuation aperture. In the embodiment of FIG. 1, the flow control mechanism is the opening and closing of the actuation aperture. Thus actuation aperture 116 opens and closes based on an electric charge 120 distributed nearby, typically across actuation aperture 116. When opposite electric charges are distributed across the actuation aperture 116, the attractive force compresses layer 101 around actuation aperture 116. The compression causes bowing of the walls of the actuation aperture closing the aperture. A more detailed explanation is provided in the description accompanying FIGS. 9-10.

After select apertures are closed, a compressor, pump, an external pressurized source or other pressure control means raises the pressure of a control fluid 124. In the illustrated embodiment of FIG. 1, closed actuation aperture 116 blocks pressurized control fluid 124 from reaching a flexible microvalve membrane 128 that rests across actuation aperture 116. Without applied pressure from the pressurized control fluid, the flexible membrane 128 remains in an unstretched or "rest" position. The rest position of flexible membrane 128 allows the main fluid 108 being controlled to flow through main conduit 112.

Figure 2:
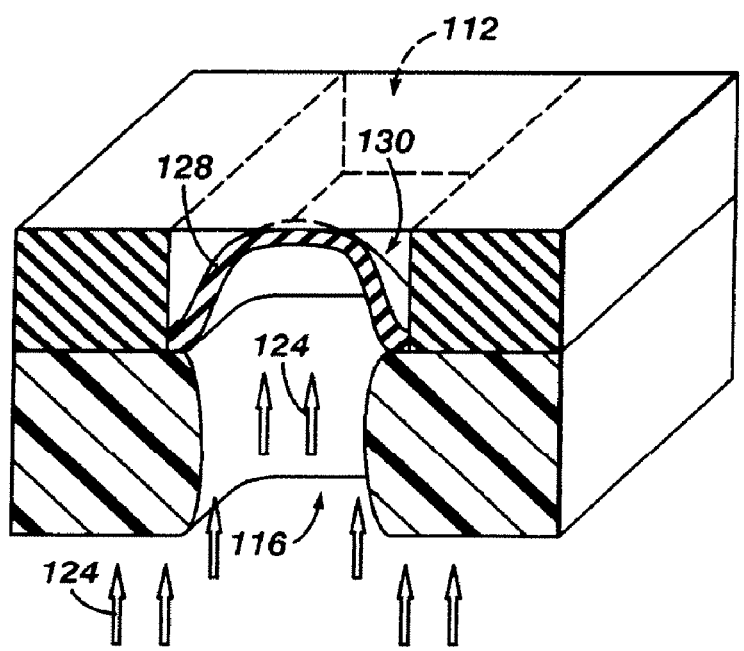
FIG. 2 shows an open actuation aperture, the open aperture produces a closed microvalve state.

FIG. 2 shows the microvalve of FIG. 1 in a closed position. In FIG. 2 the absence of an applied electric charge removes the compressive force (or in an alternate embodiment, a common polarity electric distribution across actuation aperture 116 creates a repulsive force) which causes the walls of the actuation aperture 116 to relax or "straighten". Relaxing or straightening the actuation aperture walls opens the actuation aperture. When the actuation aperture 116 opens, pressurized control fluid flows through the actuation aperture and stretches flexible microvalve membrane 128. Typically, the control fluid pressure substantially exceeds the pressure of the fluid in main fluid conduit 112. The higher control fluid pressure stretches membrane 128 into main fluid conduit 112. At sufficient control fluid pressures, the stretched membrane 128 minimizes or eliminates the space or the "gap" 130 between the membrane 128 and the walls of the main fluid conduit 122 thereby preventing fluid flow through main fluid conduit 112. In a closed state, the membrane 128 may substantially conform to the shape of the main fluid conduit sealing the main fluid conduit. The stretched membrane 128 state (or the closed microvalve) may be maintained by keeping control fluid pressure on the open aperture. Alternately, the closed microvalve may be maintained by closing actuation aperture 116 thereby trapping pressurized control fluid between the closed aperture and membrane 128.

Although FIGS. 1 and 2 show open and closed states, it should be recognized, that by adjusting the relative elasticity of membrane 128 and the control fluid pressure as a function of the pressure of the fluid to be controlled, microvalve 104 may be partially open or partially closed to control the flow rate of fluid flowing through the main conduit.

Figure 3:
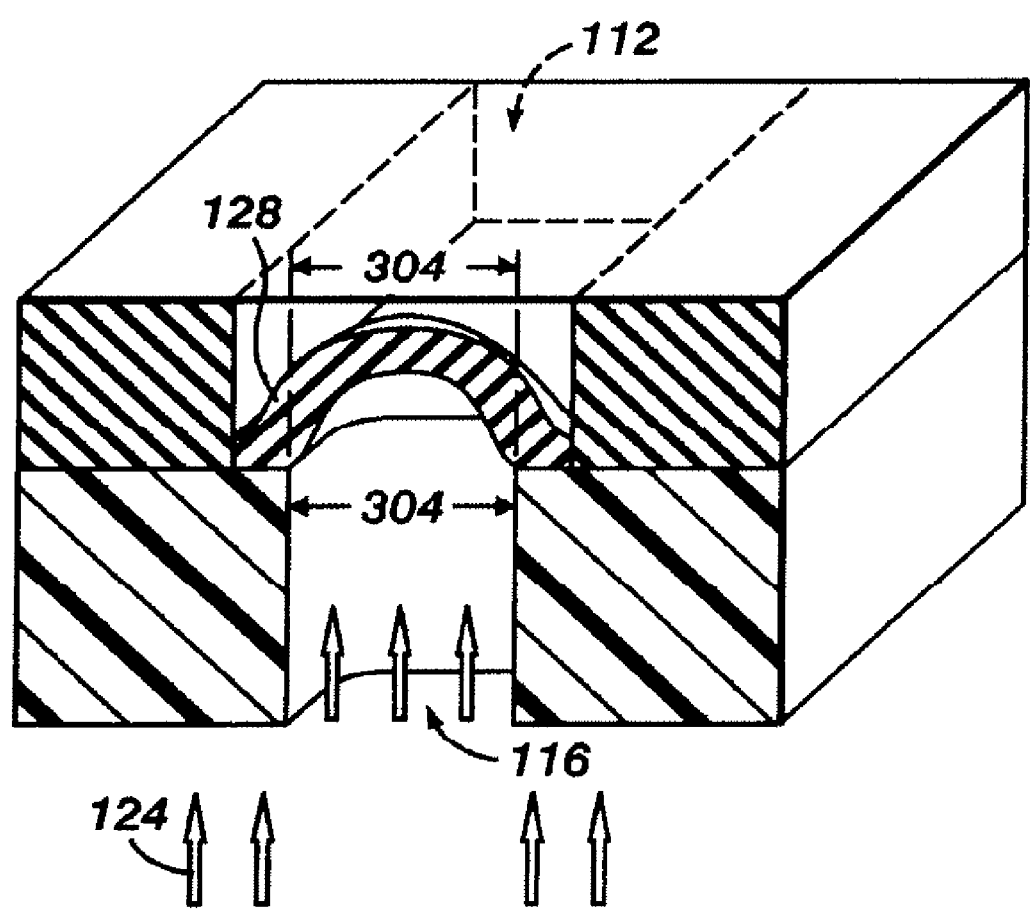
FIG. 3 shows a partially open actuation aperture to produce a partially open microvalve.

FIG. 3 shows the microvalve of FIG. 1 in a partially open state. Partial microvalve opening may be accomplished by various techniques. One method of maintaining a partially open state relies on adjusting the charge or voltage across the aperture and thus the amount of compression pressure applied to the actuation aperture 116 walls. Moderating the voltage moderates the pressure on the actuation aperture walls. Walls that have some, but not full pressure produces an actuation aperture 116 opening with a cross sectional area that is smaller than the fully open actuation aperture cross sectional area. A smaller actuation aperture opening reduces the surface area 304 of membrane 128 exposed to control fluid 124. Reducing the membrane surface area exposed to pressure from the control fluid reduces stretching of the membrane. A slightly stretched membrane reduces main fluid flow through main fluid conduit 112 without completely closing the microvalve, thus allowing control of the flow of the main fluid to desired flow rates.

A second method of keeping the microvalve partially open adjusts a differential pressure, the differential pressure being the difference between the control fluid pressure and the main fluid pressure. A reduced differential pressure from the differential pressure applied in a fully closed state keeps the membrane less than fully stretched thereby producing a partially open microvalve.

FIGS. 4-9 show various methods of fabricating a microvalve, especially the actuation aperture, applying compression forces to actuation aperture walls to control the microvalve and using a plurality of microvalves to control fluid flow. Although FIGS. 1-9 show physical opening and closing of an actuation aperture to control membrane 128, various other methods may also be used to "actuate" (here broadly defined to mean raise or lower a region) the membrane. FIGS. 10-14 show an alternative structure and method of using an electrorheological (ER) fluid to adjust control fluid flow through an actuation aperture.

Figure 4:
FIG. 4 shows a grid layer including a plurality of holes or cylindrical shaped actuation apertures in a gel structure.

FIG. 4 shows example actuation apertures 412, 416 formed in a grid layer 400. Each actuation aperture controls a control fluid flow through the actuation aperture. As used herein, "actuation aperture" is broadly defined as any path, channel, tunnel, hole or other feature in a layer (generally called "actuation aperture layer" or "grid layer") which permits a control fluid to flow through. As used herein "grid layer" or "actuation aperture layer" is broadly defined as a layer structure with a plurality of actuation apertures through the layer. The pattern of actuation apertures through the grid layer may be uniform, however that is not a requirement. In particular, the distribution of flow paths through a grid layer may be adjusted to be in the form of a uniform array or it may be distributed in other ordered or random arrangements or patterns such as patterns that satisfy the requirements of an overall fluidic circuit such as a lab-on-a-chip system.

Figure 18:
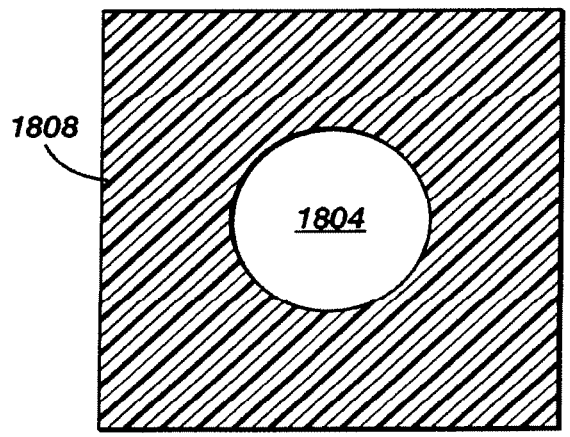
FIGS. 18 and 19 show alternate possible cross sectional shapes for an actuation aperture.
Figure 19:
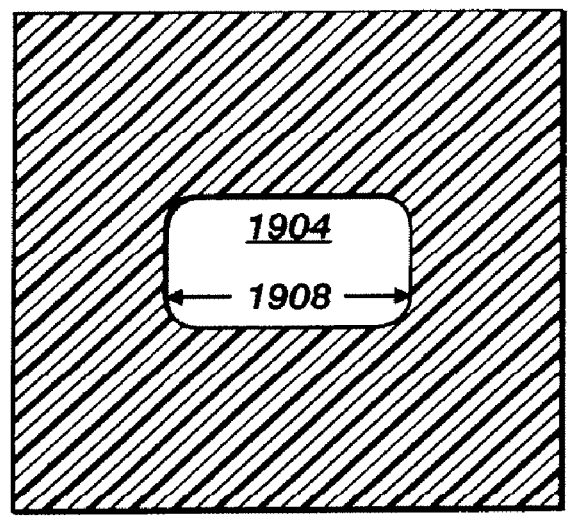
Figure 20:
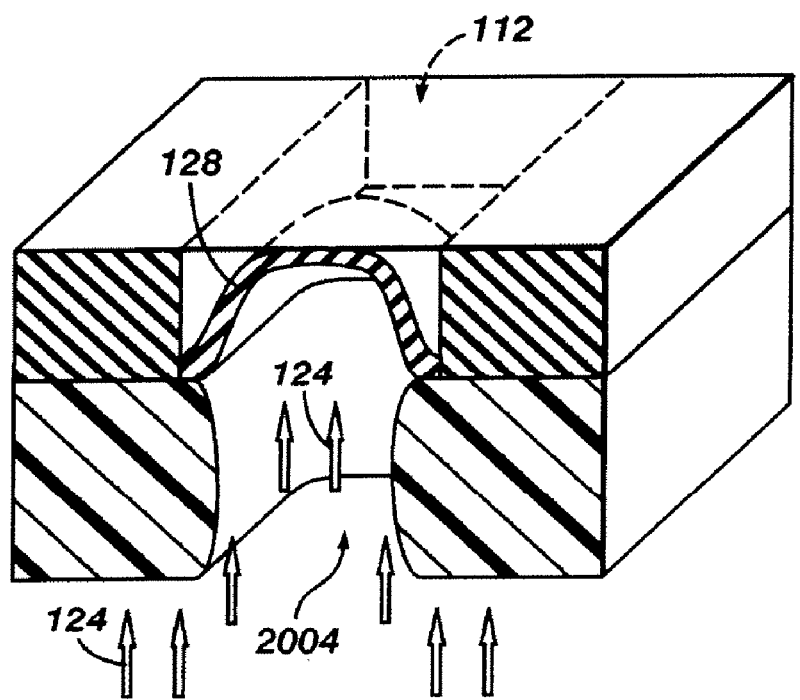
FIG. 20 shows the structure of FIG. 1 when a rectangular aperture is used.

The shape of the actuation aperture may also vary. In one embodiment the cross section of the actuation aperture is approximately circular as shown in FIG. 18. A circular actuation aperture 1804 allows a minimal uniform movement of the aperture walls 1808 to easily close the actuation aperture. In an example alternate embodiment the actuation aperture is rectangular as shown in FIG. 19. A rectangular shaped actuation aperture 1904 allows a long side 1908 of the actuation aperture to be aligned with the main fluid conduit. Aligning the long side of the actuation aperture with the direction of fluid flow in the main conduits increases flexible membrane area in the main conduit. Increased membrane surface area in the main conduit can improve matching of the stretched membrane with the main conduit shape. Improved matching can minimize leakage of main conduit fluid around the stretched membrane. FIG. 20 shows an actuated microvalve similar to the structure of FIG. 1 wherein a rectangular aperture 2004 produces an approximately rectangular shaped stretched membrane to minimize or eliminate gap 130 at lower pressures and more effectively seal a main fluid conduit.

In one embodiment, each actuation aperture 412, 416 in a gel-like material 400 layer. The gel-like material has a high dielectric strength and a low modulus of elasticity in the range of 200 kPa to 100 MPa. An example of a suitable gel-like material is Dielectric Gel #3-4207 or Gel #3-4220 from Dow Corning of Midland, Mich.) although any flexible material that has sufficient elasticity can be used.

Figure 5:
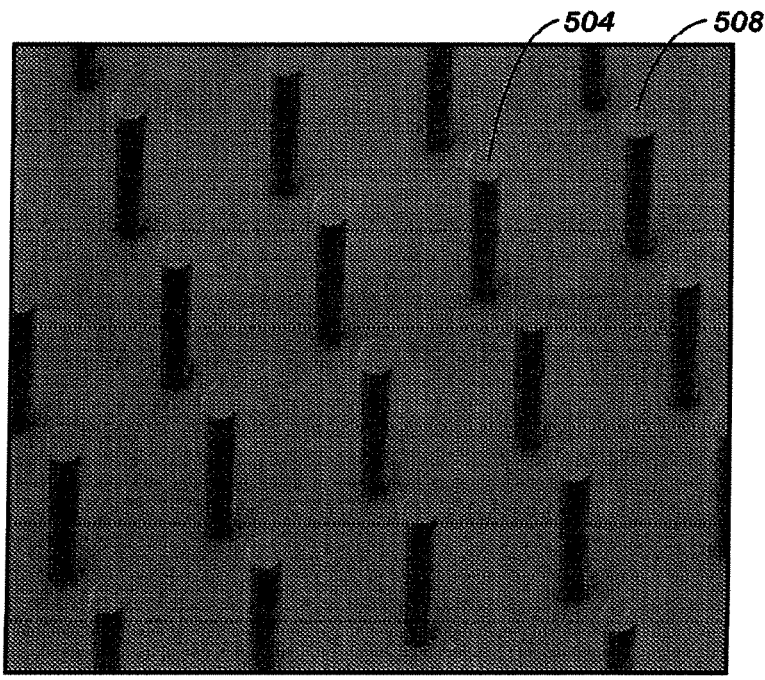
FIG. 5 shows an array of pillars that may be used to mold the plurality of actuation apertures in a gel structure.

Various methods may be used to form actuation apertures 412, 416. One example method uses a mold to mold the gel-like material 420. FIG. 5 shows an example mold that includes an array of Su-8 photoresist pillars 504, 508. The pillars may be formed using lithography or other techniques. Each pillar typically has a diameter between 5-20 microns and a height of around 50-500 microns although other dimensions may be used. The gel-like material is molded around the pillars such that upon demolding (separation of the gel material from the Su-8 photoresist), a plurality of actuation apertures remain in gel material 420.

Figure 6:
FIG. 6 shows forming a membrane layer over the grid or gel layer.

Various methods may be used to form a membrane layer. FIG. 6 shows a flexible membrane layer 604 bonded over grid layer 400. Typically, membrane layer 604 is a flexible, rubber like substance that resists fluid penetration. One example of a suitable membrane layer 604 material is a very high bond elastomer such as VHB adhesive transfer tapes from 3M Corporation of St. Paul, Minn. The membrane layer may uniformly cover grid layer 400 as illustrated or may be adjusted to cover only regions over and immediately adjacent the actuation aperture opening.

Figure 7:
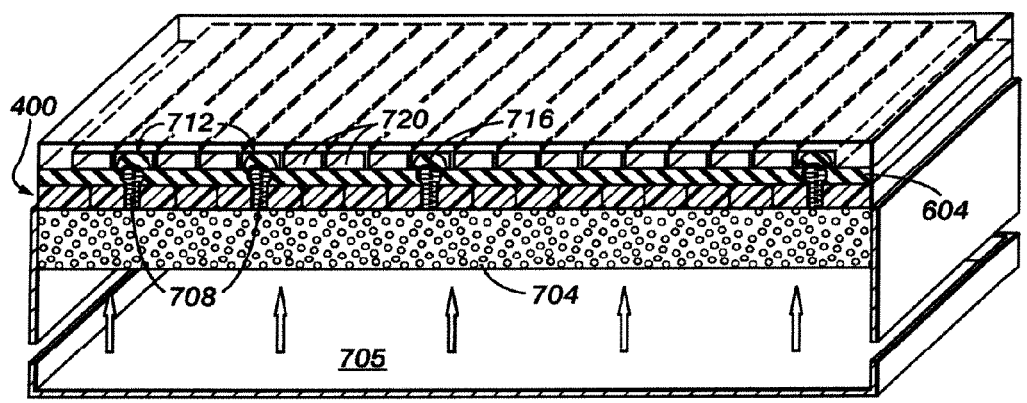
FIG. 7 shows a pressurized control fluid flowing through selected open actuation apertures thereby raising selected regions in the membrane layer and closing select microvalves preventing fluid flow through select main conduits.

FIG. 7 shows a front cross sectional view of a microvalve structure including main fluid conduits 712, 716, 720 that carry a fluid being controlled. Control fluid layers 704, 705 are formed underneath grid layer 400. Examples of typical control fluids include gases, such as air, or liquids such as an inert oil. Fluid layers 704, 705 may be a liquid or gas reservoir. In an alternate embodiment, fluid layers 704, 705 may include a porous solid or sponge like substrate that contains the actuating control fluid while providing support for the grid layer and other layers above.

Control fluid flow through open actuation apertures actuates portions of membrane layer 604. In FIG. 7, open actuation apertures such as actuation apertures 708 raise corresponding regions 712 of membrane 604. Remaining actuation apertures corresponding to microvalves designated to stay open are closed. Control fluid pressure is increased such that open actuation apertures allow control fluid to flow up through the actuation aperture and press against membrane layer 604. The pressure differential between the control fluid and the main fluid being controlled should be sufficiently high to raise the corresponding region 712 of the membrane layer to partially or completely impede as desired the flow of the main fluid being controlled.

Figure 8:
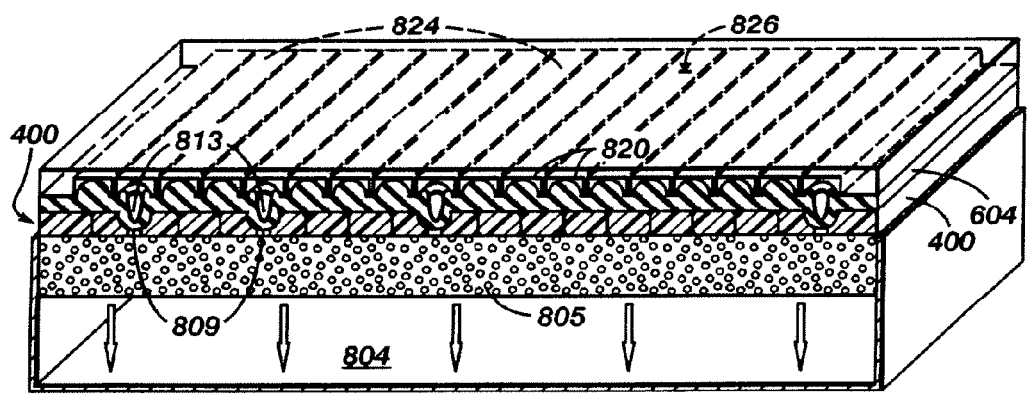
FIG. 8 shows a de-pressurized fluid creating a relief pattern in the membrane layer by lowering selected regions in the membrane and allowing a fluid to flow through select conduits corresponding to selected open actuation apertures.

Although FIGS. 1-7 show raising a flexible membrane to turn off a microvalve, in alternate embodiments, a reduced control fluid pressure may also be used to lower the membrane in order to open the microvalve. In FIG. 8, open actuation apertures control microvalves by lowering corresponding regions 813 of the "normally up" membrane layer so that fluid can flow through selected main conduits 824. When unstretched or "relaxed", membrane layer is either sufficiently thick or includes a "stopper" material that impedes fluid flow though main conduits such as main conduits 826. When, particular microvalves are to remain closed, actuation apertures corresponding to the closed microvalves are also closed, and pressure of control fluid layer 804, 805 are reduced to below that of the fluid in the main conduit. In one embodiment, the reduced pressure is below atmospheric pressure. The pressure in the main fluid conduit pushes down the membrane in these regions and the de-pressurized control fluid flows through any open actuation apertures 809. Instead of closing a microvalve as in FIGS. 1-7, this actuation of corresponding membrane layer region 513 opens the microvalve and allows fluid to flow through the corresponding main conduit. To keep the microvalve open, a constant lower pressure may be maintained on the control fluid in fluid layer 805.

Alternately, a uniform charge may be applied that closes all the actuation apertures in the grid layer effectively trapping the fluid at lower pressure between the membrane layer and the grid layer in the actuated region.

Figure 17:
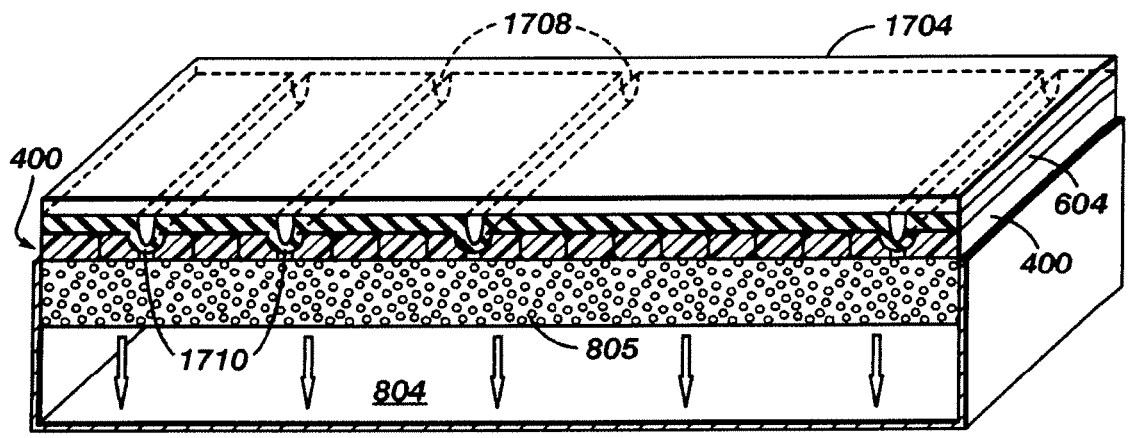
FIG. 17 shows a microvalve similar to the microvalve of FIG. 8 except that negative control fluid pressure is used to open the microvalve which is in a "normally closed" position.

An alternate embodiment of a negative pressure system that actually creates channel through a flexible membrane is shown in FIG. 17. In FIG. 17, the actuation apertures are themselves long channels. In the illustrated embodiment of FIG. 17, the membrane layer 604 is normally flush against top layer 1704. Open actuation apertures 1710 and a negative pressure or in the control fluid layer produces actual channels 1708 in the membrane layer 604. Main fluid being controlled can flow through these channels that form the main conduits.

Each grid layer 400 actuation aperture can be individually addressed using a charge pattern. One method of generating a charge pattern is using a photoreceptor and raster output scan (ROS) system as done in xerographic systems. In such systems a laser is used to discharge select portions of a charged plate. Such a system is described in U.S. Pat. Nos. 4,687,317, 5,019,837, 5,404,202, which are hereby incorporated by reference. However, in this application, instead of attracting toner particles as is done in conventional Xerography systems, the charge pattern produces an electric field that closes microvalve holes. The hole aperture (amount of closing) corresponds to the electric field strength generated by the charges. Stronger electric fields corresponding to higher charge densities produce smaller apertures.

Figure 9:
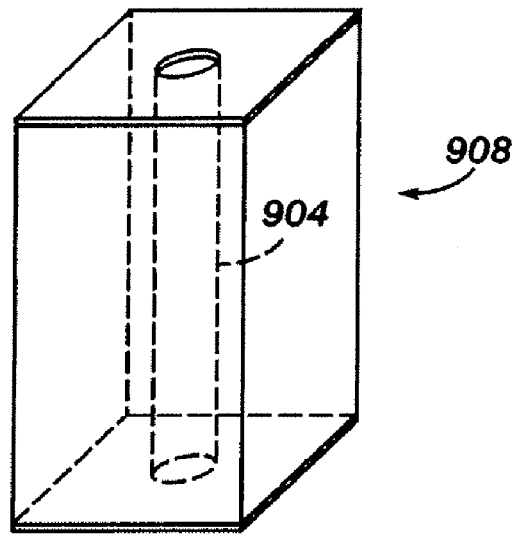
FIGS. 9-10 show how the actuation aperture closes with the application of charge that applies resulting electrostatic forces to the gel material in the grid gel layer.
Figure 10:
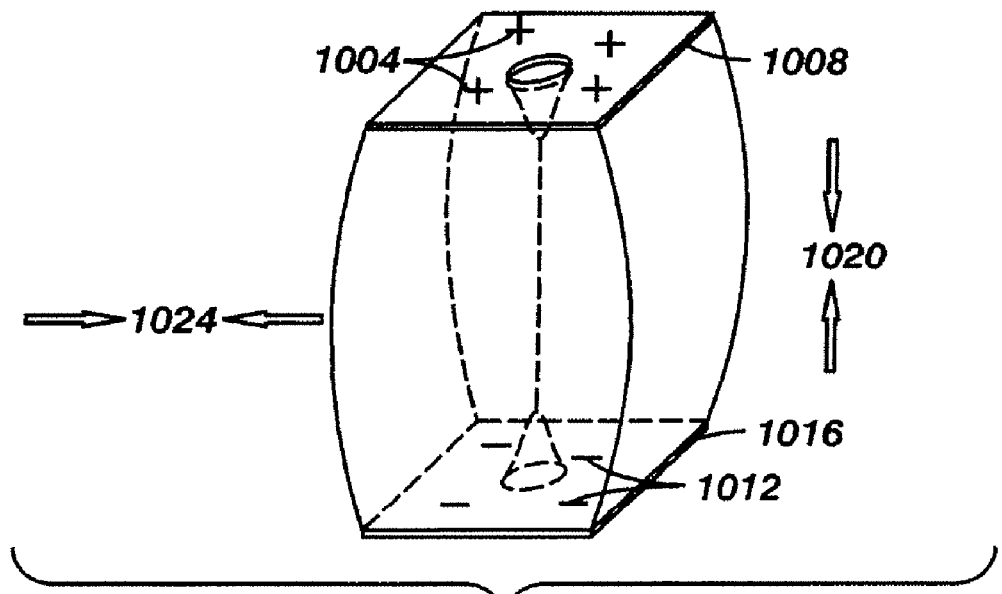

FIGS. 9 and 10 show a side cross sectional view of an actuation aperture being closed. FIG. 9 shows gel material 908 surrounding the actuation aperture, in this case a hole column 904. Gel material 908 can be a special class of encapsulant that cures to a soft material. Example gel hardness ranges between 5-95 on the shore hardness durometer scale. Typical gel densities range between 0.9 and 1.22 g/cc. The gel has many of the stress relief and "self-healing" properties of a liquid while still providing the dimensional stability of an elastomer.

The gel itself may be made from a wide variety of materials, although silicone is a common material. Because opening and closing of the actuation aperture will involve high electric fields, the gel should have a sufficient dielectric strength to avoid breakdowns at desired electric field levels needed for actuation. In one embodiment, charges 1004 and 1012 of FIG. 10 result in 300-600 volts applied across the approximately 100-200 micron thick gel layer, thus the gel should not break down when subject to the resulting high electric fields. A low modulus of elasticity in the range of 200 kPa to 100 MPa helps the gel retain its shape in the absence of an electric field, while allowing compression of the gel sufficiently to close an approximately 10-40 micron diameter hole column 904 when the electric field is applied. Examples of suitable dielectric gels include Dielectric Gel #3-4207 or Gel #3-4220 from Dow Corning of Midland, Mich.

Prior to fabrication, Dow Corning and other manufacturers typically provide the gel as a liquid which the end user assembles and "cures". In one embodiment, the gel is a two part liquid that is set or otherwise cured upon mixing to form the gel. In alternative forms, the gel may be fabricated from a single liquid that is the cured using heat or UV radiation. Curing may occur after the liquid is poured around a mold, such as the mold of FIG. 5 such that the resulting gel is shaped as desired.

In order to control the actuation aperture opening and closing, FIG. 10 shows positive charges 1004 deposited or closely positioned to a first side 1008 of gel material 908 and negative charges 1012 deposited on, or closely positioned to, an opposite side 1016 of the gel material. The resulting electric field produces a compression force in a compressive force direction 1020 on gel material 904. The compression force slightly reduces the distance between the entrance and exit openings of the hole column that functions as the actuation aperture. In the process, the compressive force bows the hole sidewalls constricting or otherwise closing hole column 904.

In the illustrated embodiment, the force applied to the gel by the charge is in a force direction 1020 parallel to hole column 904 sidewalls resulting in a bowing of the hole sidewalls in a direction 1024 approximately perpendicular to force direction 1020. Thus the force direction does not have a vector component that overlaps the direction of wall movement that causes the hole closing. In the illustrated example, the hole closing is caused entirely by compression induced dielectric gel spreading. However, when actuation apertures other than a perpendicular column are used, some components of force direction 1020 may not be orthogonal to the sidewall movement in which case, the actuation aperture closing may be caused by direct pressure from force direction 1020.

Although FIG. 10 shows the charges deposited directly on the gel material, it should be understood that the charge may be applied to other surfaces. Those other surfaces may include membrane layer 604. In alternate embodiments, flexible electrodes typically, but not necessarily made of metal may be deposited near each entrance of each hole column 904 to facilitate electrical field accumulation near the gel entrances. When electrodes are used, the electrodes should be electrically isolated from adjacent electrodes to allow independent addressing, opening and closing, of each hole column (or group of hole columns when a microvalve includes a group of hole columns that together function as an actuation aperture). Regardless of how the charge is applied and maintained, the primary criteria is that the charges produce a localized net compressive force to the gel that constricts or closes a normally open hole or that the charges produce a localized net repulsive force that opens a normally closed hole.

After the appropriate actuation apertures are closed, pressure is applied to fluid layer 704. The pressurized fluid flows through open holes 708 or actuation apertures that are not electrostatically closed. The pressurized fluid raises corresponding regions 712 of the membrane layer to close the corresponding microvalve. To ensure that the microvalve remains closed, a constant pressure may be maintained on the control fluid in fluid layer 704. Alternately, a uniform charge may be applied that closes all the holes in the grid layer effectively trapping the control fluid.

Figure 11:
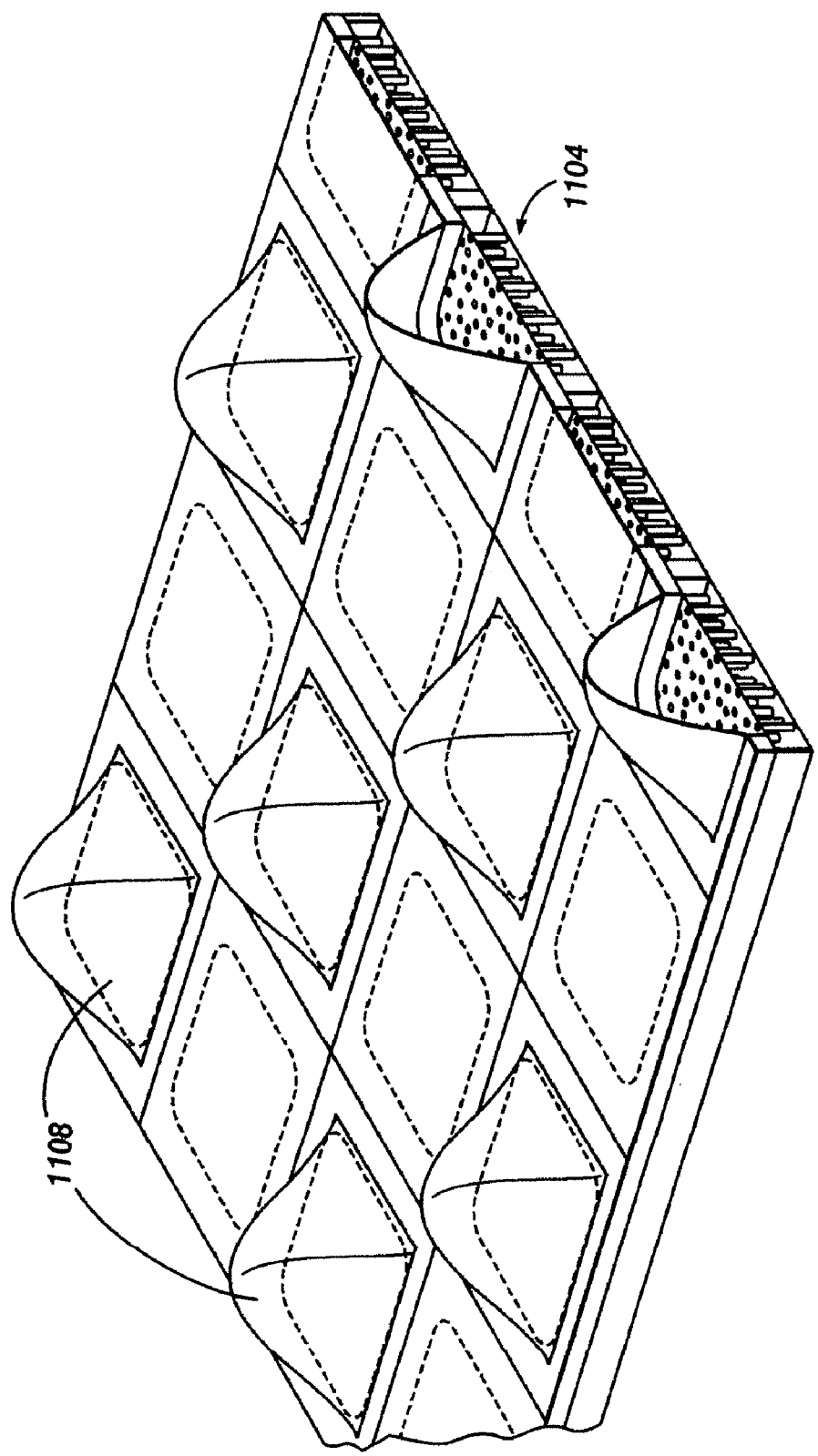
FIG. 11 shows a three dimensional relief surface after actuation where multiple actuation apertures correspond to a single microvalve.

Although FIGS. 7 and 8 show one bump or well (dimple) per grid hole or actuation aperture implying a one hole to one microvalve correspondence, it should be understood that a one to one correspondence between actuation aperture and each microvalve is not required. FIG. 11 shows one example of a three dimensional topography that results from allowing multiple holes 1104 or actuation apertures that raises a single corresponding membrane area to form a bump such as bumps 1108. Each bump corresponds to a microvalve.

When microvalves need to be reset, the substrate may be discharged. One method of discharging the entire charged surface uses light such as is done in Xerography. Other methods include physical contact with a electrically conductive grounding plate that discharges the master plate.

Figure 16:
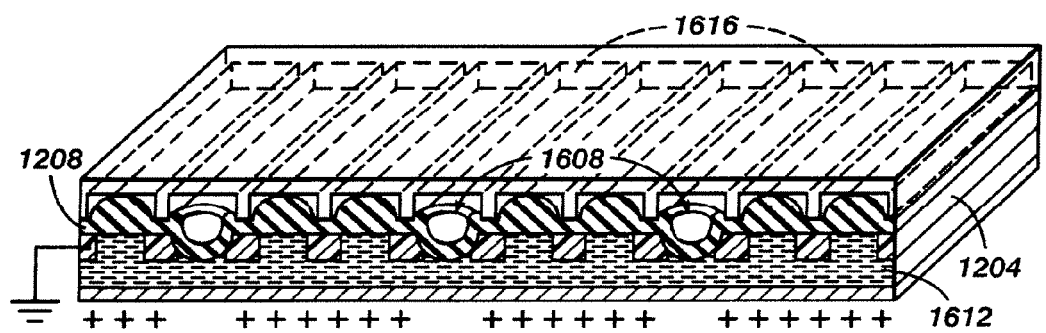
FIG. 16 shows the application of an electrical charge pattern to an electrode layer in close proximity to the ER fluid to open select microvalves upon de-pressurization of the ER fluid.

Removing the charge removes the electric field across the gel layer. Without an electric field, the force applied by the electric field on the gel relaxes thereby "resetting" the holes (or actuation apertures) to their "normal" or original shape. After re-opening or re-closing the actuation apertures to their normal shape, the microvalve settings may be reset to an open position by reducing the amount of fluid contained between the membrane layer and the gel 400 across all microvalves. In particular, the control fluid pressure in fluid layer 704 or layer 705 is typically brought close to atmospheric pressure (or even slightly below atmospheric pressure creating a slight vacuum in the embodiments where bumps are formed as illustrated in FIG. 7 or slightly above atmospheric pressure where recesses are used to open main fluid conduits and microvalves as illustrated in FIG. 8 and FIG. 16). Internal stresses in the elastomeric printing layer, possibly assisted by a slight pressure differential between the fluid layer and the external atmospheric pressure, forces the fluid to reflow through the open actuation apertures thereby "erasing" the microvalve states. The actuation aperture array can then receive a new charge distribution to produce a new set of microvalve settings.

Although the prior description describes opening and closing actuation apertures and the corresponding microvalves, as previously described in FIG. 3, the microvalves do not have to be completely opened or closed. In some embodiments, a reduction in fluid flow without completely closing the microvalve is possible where the actuation aperture of the microvalve is only partially closed. For example, if 600 volts is a "full closing voltage" that completely closes an actuation aperture, a partial closing may be achieved by applying a voltage less than 600 volts. The lower voltage reduces the actuation aperture opening size but does not completely close the hole. The reduced actuation aperture size allows some control fluid to leak through thereby partially raising or lowering the membrane controlling the main fluid flow.

FIGS. 12-16 show an alternate embodiment of the invention that uses an electrorheological control fluid as a flow control mechanism. In FIGS. 12-16, an electric field changes the control fluid viscosity to effectively simulate "open and close" actuation aperture states. In the context of an electrorheological fluid, the "closing" of the actuation aperture is not a physical closing but rather an increased electrorheological fluid viscosity such that the control ER fluid flow through the actuation aperture is "plugged" thereby "closing" the actuation aperture.

Figure 12:
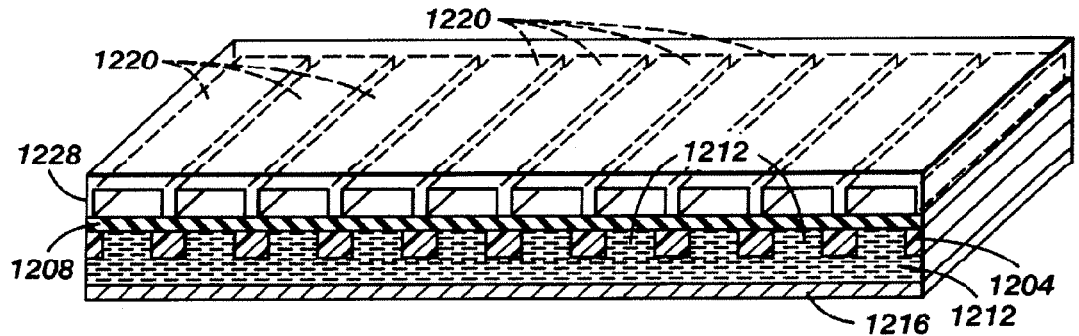
FIG. 12 shows a plurality of microvalves that are controlled by an electrorheological fluid (ER fluid).

FIG. 12 shows a microvalve array to control the main fluid flowing through conduits 1220. Openings in a grid layer, such as a mesh 1204, form the actuation apertures. One example of a mesh is a Stork mesh made by Stork Prints Corporation of Charlotte, N.C. Over the mesh layer, a flexible membrane 1208 is deposited. Membrane 1208 is typically a flexible rubber like substance that resists fluid penetration. One example of a suitable membrane 1208 is a very high bond elastomer such as VHB adhesive transfer tapes from 3M Corporation of St. Paul, Minn. A series of channels 1220 that serve as main conduits for a fluid to be controlled are formed over membrane layer 1208.

Underneath the mesh or grid layer 1204 is a layer of electrorheological fluid (hereinafter ER fluid) 1212 that serves as a control fluid. ER fluids are special classes of fluids in which the apparent viscosity and yield stress can be increased by applying an external electrical field. As used herein, "apparent viscosity" will be defined as the change in state of an ER fluid upon application of an electric field. The ER fluid is believed to undergo a change in an electric field resulting in an increase in its shear yield stress. A detailed description of ER fluids is provided in 'Electrorheological Fluids' by Tian Hao, Advanced Materials 2001, vol. 13, no. 24, page 1847 which is hereby incorporated by reference.

In one embodiment, the ER fluid includes insulated iron particle suspensions in an insulating liquid. Upon application of an electric field, the particles align in the field direction to produce fluid thickening (an increase in viscosity). One example of such a fluid is a fluid that contains 15% by weight of insulated iron particles suspended in an Isopar-V mineral oil. One example of appropriate particles are 2-4 micrometer diameter insulated iron particles such as Carbonyl Iron Powder coated with a phosphate/SiO.sub.2. Such coated Carbonyl Iron Powder is commercially available as CIP-EW-I from BASF Corporation of Ludwigshafen, Germany. Several other types of Electrorheological fluids may also be used in this embodiment, including but not limited to suspensions of any non-conducting or electrically insulated particulates dispersed in an insulating liquid. Other utilizable Electrorheological fluids include fluids where one liquid phase is dispersed inside another fluid phase to create an emulsion.

Various methods are available for applying an electrical field to the ER fluid and thereby controlling the fluid viscosity/yield stress. One method of applying such a voltage is to apply the voltage directly to the top of the conduit containing layer 1228. Although applying charge directly over the surface of the conduit containing layer simplifies construction, high voltages are needed to generate the electric field in the ER fluid layer due to the distance between the ER fluid layer and the top of the conduit containing layer.

Figure 13:
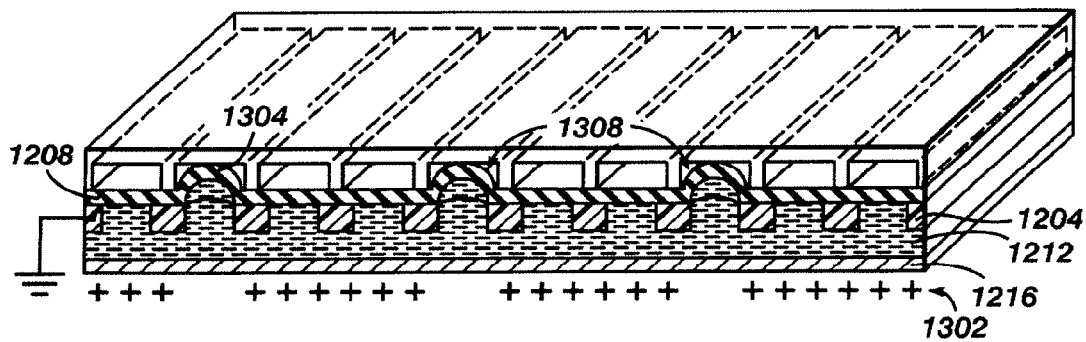
FIG. 13 shows the application of an electrical charge pattern to an electrode layer in close proximity to the ER fluid to cause select regions of the ER fluid to become more viscous and thereby redirect control fluid flow such that select portions of the membrane rise and close select microvalves.

A second method of applying an electric field to the ER fluid is by applying charge to a backing electrode 1216. FIG. 13 shows applying a charge 1302 to backing electrode 1216 and electrically grounding the grid layer 1204 to create an electric field across the ER Fluid 1212. Portions of the electrorheological fluid exposed to high electric fields become very viscous and have a high yield stress. As the ER fluid flows along the control fluid layer and is pressurized the highly viscous areas of the fluid limits fluid flow through the holes which serve as actuation apertures in grid layer 1204. However in regions with a low electric field, the fluid viscosity is low and the fluid pressure is easily transferred to the membrane layer 1208 resulting in bumps or elevated membrane portions 1304, 1308 of the membrane that close off fluid flow through corresponding conduits such as conduit 1220.

In another embodiment as illustrated in FIG. 16, the ER fluid is de-pressurized (its pressure is adjusted to below atmospheric pressure). Highly viscous areas of the fluid limits fluid flow through the holes in grid layer 1204. However in regions with a low electric field, the fluid viscosity is low and the fluid is easily transferred away from under the membrane layer 1208 upon de-pressurization. Thus wells or recessed portions 1608 of membrane layer 1208 form in the low electric field/low viscosity areas thereby allowing fluid to flow through the main fluid conduits 1616.

Other means of positioning charge to generate an electric field either in the holes or in close proximity near the holes are also possible. For example, a porous electrode may be used directly beneath the grid layer. The porous electrode would allow fluid flow and the close proximity to the hole entrances would allow low voltages to be used.

In practice, it has been found that in the absence of an electric field, when an actuation pressures of around 35 psig (2.4 atms) was applied to an ER fluid, the fluid flowed through approximately 150 micron diameter grid holes, and produced 75-85 micron bumps on a 40 micron thick 3M-VHB elastomer. In regions where a raised printing surface was undesirable, 600 to 800 volts applied across a 0.5 mm gap of ER fluid generated an electric field sufficient to prevent substantial bump formation. Although these are example values, it should be noted that other values may be used. Typically the grid holes should be large enough to allow flow of the ER fluid in a low viscosity state but small enough to resist ER fluid flow when the ER fluid is in a high viscosity state. Typical hole size ranges are between 5 microns and 250 microns although larger or smaller holes may also be used.

After raising or lowering select areas of the membrane layer to open and close selected microvalves, the microvalves typically are maintained in a steady state until flows need to be changed. One method of maintaining the steady state of the microvalves is to maintain the electric field distribution and the pressure on the ER fluid initially used to position the membrane. An alternate method is to "immobilize" ER fluid by applying a high uniform electric field across all the ER fluid in the actuation apertures. As used herein "immobilize" means that the yield stress is substantially increased, typically beyond a value of 4 kPa, such that fluid flow of the ER fluid, particularly through the hole directly above the immobilized fluid is substantially impeded.

Figure 14:
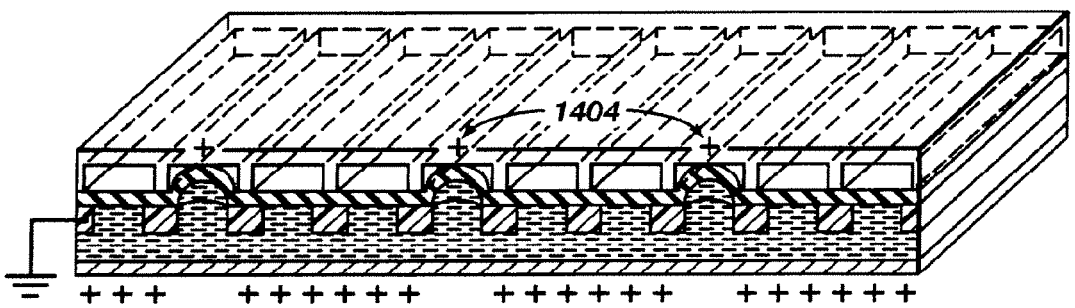
FIG. 14 shows applying additional charge in close proximity to the ER fluid to "freeze" the relief pattern for in the membrane layer.
Figure 15:
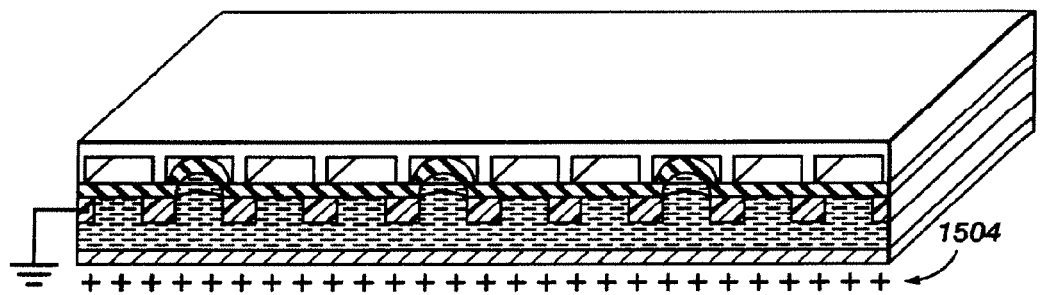
FIG. 15 shows applying uniform charge to the bottom electrode under the ER fluid layer to "freeze" the control fluid and preserve the state of the microvalves.

FIG. 14 shows adding charge 1404 near the vicinity of the raised relief regions to "immobilize" the ER fluid. Although FIG. 14 shows adding charge to the fluid conduit layer near closed microvalves, it should be understood that other charge distributions and locations are possible. For example, FIG. 15 shows placing charge 1504 across the entire backing electrode to produce an electric field that renders all ER fluid highly viscous thereby immobilizing the ER fluid. The high viscosity prevents internal elastomer stress release in the membrane layer because the force applied by the membrane layer, typically an elastomer, is insufficient to push the highly viscous ER fluid through the grid holes. Thus the state of the microvalves may be maintained even in the event the ER fluid pressure is reset to values close to atmospheric pressure levels.

As in the case of the microvalve controlled via compression of a gel as described in FIGS. 6-10, partially open microvalves may be achieved in the ER fluid embodiments by applying a weak electric field. A weak electric field increases viscosity but not to the point that it immobilizes the ER fluid. In regions with a more viscous but not immobilized fluid, relief pattern is formed but to less then the full height, thereby partially but not completely closing a corresponding microvalve.

The preceding description includes many details. These details are included in order to provide examples and thereby facilitate understanding of the invention. The description details are not intended, and should not be interpreted to limit the scope of the invention. Instead, the invention should only be limited by the claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method of opening and closing a microvalve array comprising:
   selecting a first plurality of microvalves of the microvalve array to be opened and a second plurality of microvalves of the microvalve array to be closed;
   applying an electrical charge distribution to a plurality of actuation apertures in an actuation aperture layer such that pressure is applied to select actuation apertures corresponding to the first plurality of microvalves to be opened, thereby closing the select actuation apertures, wherein the actuation aperture layer comprises a dielectric gel material having a first surface and an opposing second surface, the actuation aperture being formed by sidewalls extending entirely within the dielectric gel material between a first opening defined in the first surface and a second opening defined in the second surface, and wherein applying the electrical charge distribution to the plurality of actuation apertures comprises generating an electric field at each said select actuation aperture by applying a first electrical charge of a first polarity near the first opening of each said select actuation aperture and a second electrical charge of a second polarity near the second opening of each said select actuation aperture such that attraction between the applied charges generates said electric field across the dielectric gel material disposed between the first and second openings of each said select actuation aperture, wherein a modulus of elasticity of the dielectric gel material and a strength of said electric field are characterized in that said electric field generates a compressive force on the dielectric gel material sufficient to cause elastic deformation of the dielectric gel material such that the distance between the first opening and the second opening of each said select actuation aperture is reduced and the sidewalls of said each select actuation aperture are bowed sufficiently to close said each select actuation aperture, thereby preventing flow of the control fluid through said each select actuation aperture; and increasing pressure in a fluid control layer such that higher pressure control fluid flows only into open actuation apertures, the increasing pressure to stretch regions of a membrane corresponding to the open actuation apertures, the stretched membrane to block a corresponding main fluid conduit thereby preventing main fluid flow through the corresponding main fluid conduit.

2. The method of claim 1 further comprising altering the electrical charge distribution to apply an electric charge to all the actuation apertures thereby closing all the actuation apertures to maintain an open or closed state of all the microvalves of the microvalve array regardless of changing pressure in the control fluid.

* * * * *